(12) United States Patent
Benosman et al.

(10) Patent No.: US 9,419,437 B2
(45) Date of Patent: Aug. 16, 2016

(54) FINITE TIME POWER CONTROL FOR SMART-GRID DISTRIBUTED SYSTEM

(71) Applicant: Mitsubishi Electric Research Laboratories, Inc., Cambridge, MA (US)

(72) Inventors: Mouhacine Benosman, Boston, MA (US); Evangelos Polymeneas, Atlanta, GA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 420 days.

(21) Appl. No.: 14/134,075

(22) Filed: Dec. 19, 2013

(65) Prior Publication Data
US 2015/0177761 A1    Jun. 25, 2015

(51) Int. Cl.
| | | |
|---|---|---|
| G05B 15/02 | (2006.01) | |
| H02J 3/38 | (2006.01) | |
| H02J 3/48 | (2006.01) | |
| H02J 3/50 | (2006.01) | |
| H02J 13/00 | (2006.01) | |
| G06Q 50/06 | (2012.01) | |
| H02J 3/00 | (2006.01) | |

(52) U.S. Cl.
CPC ............... *H02J 3/381* (2013.01); *G06Q 50/06* (2013.01); *H02J 3/48* (2013.01); *H02J 3/50* (2013.01); *H02J 13/0006* (2013.01); *H02J 2003/003* (2013.01); *Y02E 10/763* (2013.01); *Y02E 40/72* (2013.01); *Y02E 40/76* (2013.01); *Y04S 10/12* (2013.01); *Y04S 10/54* (2013.01); *Y04S 10/545* (2013.01)

(58) Field of Classification Search
CPC . H02J 3/381; H02J 2003/003; H02J 13/0006; H02J 3/50; H02J 3/48; Y04S 10/545; Y04S 10/12; Y04S 10/54; Y02E 40/72; Y02E 10/763; Y02E 40/76; G06Q 50/06
See application file for complete search history.

(56) References Cited

U.S. PATENT DOCUMENTS

| | | | |
|---|---|---|---|
| 8,331,071 B2 | 12/2012 | Benedict et al. | |
| 2013/0018516 A1* | 1/2013 | Chee | H02J 3/383 700/287 |

* cited by examiner

*Primary Examiner* — Kenneth M Lo
*Assistant Examiner* — Derrick Boateng
(74) *Attorney, Agent, or Firm* — Gene Vinokur; James McAleenan; Hironori Tsukamoto

(57) ABSTRACT

A distributed energy resource (DER) exchanges with each neighboring DER portions of the total demand for power accumulated by the DER and each neighboring DER and portions of a total capability of the network to generate the total power accumulated by the DER and each neighboring DER before each communication step. The DER updates the portion of the total demand for power and total capability accumulated by the DER using the portions of the total demand and the portions of the total capability received from the neighboring DERs. After the fixed number of communication steps, the DER accumulates the total demand for power and the total capability of the network and generates an amount of the power as a product of the total demand for the power and a ratio of a maximum capability of the DER to generate the power and the total capability of the network.

8 Claims, 7 Drawing Sheets

FINITE TIME POWER CONTROL FOR SMART-GRID DISTRIBUTED SYSTEM

FIELD OF THE INVENTION

This invention relates generally to a power grid, and more specifically to controlling distributed energy resources (DERs) connected to the power grid to form a distributed energy system.

BACKGROUND OF THE INVENTION

Distributed energy resources (DERs) play an ever-increasing role in electrical power generation. Generally, a DER is a relatively low-power (relative to utility-scale fossil fuel, hydroelectric and nuclear power plants) electricity-generating or storage device that is connected to an electrical power system (EPS), for example, a utility power grid, to form distributed energy system.

Examples of DERs include diesel engine-generators, wind turbines, solar cells, fuel cells, backup batteries, and any combination of these. DERs are used for a number of reasons. For example, in some applications DERs are used to provide backup power when primary power from a utility grid is interrupted. In other applications DERs are used to reduce reliance on electrical power from a utility power grid. In still further applications, DERs are used to supplement power provided by conventional electrical power generators, such as fossil-fuel-fired and nuclear-fission driven power plants. DERs are becoming increasingly popular as more manufacturers are building DERs that generate electricity from renewable resources, such as wind and solar energy.

The DERs can be connected to a single or three phase network, according to their power ratings. In an alternating current (AC) distribution grid, DER can generate one or two components of total power, i.e., an active power (symbolized as P) and a reactive power (symbolized as Q). Reactive power is the component of electric power that does not produce any work, and signifies the phase angle at which DER's supply their current to the grid.

The reactive power generated or absorbed by the DER influences the state of the grid. Specifically, the amount of reactive power is proportional to the voltages in the grid, i.e., when more reactive power is generated, the voltages in the grid increase and when less reactive power is generated, the voltages decrease.

The capability of DER to provide active or reactive power to the grid is limited and may vary over time. There are potentially thousands of DER devices connected to the grid, and every DER has to cooperate to provide a total power (sum of active or reactive powers) required by the grid at a specific time. Accordingly, there is a need for a method by which each DER determines the amount of power to supply to the grid, such that a total number of DERs generates the target amount of power, subject to restriction that each DER remains within its capability bounds for the generation of the power.

Some conventional methods for this power sharing problem in smart distribution grids include methods using local measurements at each DER to assist in calculating its power output. However, those methods do not consider the capacities of other DERs and, are inaccurate, see, e.g., U.S. Patent Publications 2010/0117606, and 2012/0105023.

Some other methods assume full communications, where the DERs communicate with each other or with a centralized entity that specifies the power of each DER to meet the target is met, and then dispatches that command to each DER. This method suffers from communication overhead and is too slow for some situations. See, e.g., U.S. patent and patent Publications U.S. Pat. No. 7,508,173, U.S. 2010/0067271, U.S. 2012/0205981, U.S. 2012/0235498, U.S. 2012/0310434, U.S. 2013/0018516.

Another approach is based on partial communication between each DER and its neighbors. However, the current methods are asymptotical, i.e., each DER converges to a solution asymptotically without ever achieving the exact value of the power to be generated.

Accordingly, there is a need to provide a method for determining, within a finite number of communication steps, the power to be generated by each distributed energy resource (DER) into a power grid, such that the power generated by all DERs connected to the power grid meets the total power requirement of the power grid without violating the constraints of each DER.

SUMMARY OF THE INVENTION

Distributed energy resources (DERs) play an ever-increasing role in electrical power generation. Generally, a DER is a relatively low-power electricity-generating or storage device connected to an electrical power grid. Examples of DERs include diesel engine-generator sets, wind turbines, solar cells, fuel cells, backup batteries, and any combination of these. DERs are used for a number of reasons, such as to provide backup power to the grid, to reduce reliance on electrical power from a utility power grid or to supplement power provided by conventional electrical power generators.

One objective of some embodiments of the invention is to provide a method for generating power by each DER, such that a total demand for power in the power grid is jointly satisfied by the network of DERs. Another objective of some embodiments is to provide such a method that considers the capability of each DER to generate the power, and optimizes the number and the size of the messages communicated among the DERs.

Some embodiments of the invention are based on a recognition that if each DER has access to its maximum capability to generate power, as well as to a total demand for power in the power grid, and to a total capability of the network to generate the total power, than each DER can determine its power contribution as a product of the total demand for power and a ratio of a maximum capability of the DER to generate the power and the total capability of the network. Such contribution ensures fair distribution of the demand for power among the DERs.

Each DER can determine, e.g., measure, its maximum capability to generate power. However, the total demand for power and the total capability of the network to generate the power is generally unknown and vary over the time.

Some embodiments are based on the recognition that there is a need and a possibility to determine, by each DER, the total demand for power and the total capability of the network within a fixed number of communication steps. Specifically, it was realized that if the portions of the total demand for power and the total capability of the network are recursively accumulated and propagated by each DER, after the fixed number of communication steps, all DERs can accumulate the correct value of the total demand for power and the total capability of the network.

Such realization allows exchanging, at each communication step, only two types of data, i.e., portions of the total demand for power, and portions of a total capability of the network accumulated by each DER before the communication step. Thus, the amount of exchanged messages is reduced, as compared, e.g., with a total exchanged of information among the DERs.

Also, such realization allows determining the correct value of the total demand for power and the total capability of the network within a fixed number of communication steps, as contrasted with conventional asymptotical methods, in which each DER converges to a solution asymptotically without ever achieving the exact value of the power to be generated.

Some embodiments of the invention encode and decode portions of the total demand for power and the total capability of the network exchanged among the DER. Such encoding/decoding operations allow to correctly determining the increase of the total demand for power and the total capability of the network contributed during each communication step. Some embodiments take advantage from the fact that a structure of the network of DER is relatively stable. Those embodiments study the structure of the network of DER and determine the encoding and decoding coefficients based on the structure.

Accordingly, one embodiment discloses a method for generating power by a distributed energy resource (DER) for a power grid including a network of DERs, such that a total demand for the power in the power grid is jointly satisfied by the network of DERs. The method includes exchanging, between the DER and each neighboring DER at each communication step of a fixed number of communication steps, portions of the total demand for power accumulated by the DER and each neighboring DER before the communication step, and portions of a total capability of the network to generate the total power accumulated by the DER and each neighboring DER before the communication step; updating, after each communication step, the portion of the total demand for power accumulated by the DER before the communication step using the portions of the total demand for power received from the neighboring DERs; updating, after each communication step, the portion of the total capability of the network accumulated by the DER before the communication step using the portions of the total capability of the network received from the neighboring DERs; accumulating, after the fixed number of communication steps, the total demand for power and the total capability of the network; and generating an amount of the power as a product of the total demand for the power and a ratio of a maximum capability of the DER to generate the power and the total capability of the network.

Another embodiment discloses a method for generating a reactive power by a distributed energy resource (DER) into a power grid including a network of DERs. The method includes receiving, from neighboring DERs at each communication step, at least a portion of a total demand of reactive power in the network and at least a portion of a total capability of the network to generate the reactive power, wherein, at each communication step, each neighboring DER recursively updates the portion of the total demand and the portion of the total capability based on information propagated within the network at each communication step; determining, at each current communication step, an update of the total demand and an update of the total capability corresponding to the current communication step using a contribution coefficient predetermined for the current communication step; summing the updates of the total demand determined for a finite number of communication step to produce the total demand of the reactive power in the network; summing the updates of the total capability determined for the finite number of communication step to produce the total capability of the network; and generating an amount of the reactive power proportional to the total demand and a ratio of a maximum capability of the DER to generate the reactive power and the total capability of the network.

Yet another embodiment discloses a distributed energy resource (DER), including a memory storing a finite number of contribution coefficients, each contribution coefficient corresponds to a communication step from the finite number of communication steps and indicates an update of a total demand for power at the corresponding communication step; a receiver for receiving, at each communication step, a portion of the total demand for power accumulated by each of neighboring DERs; a transmitter for transmitting, to each of the neighboring DERs at each communication step, a portion of the total demand for power accumulated by the DER; and a processor for decoding from the received portion of the total demand for power the update of the total demand for power using a contribution coefficient corresponding to a current communication step and for accumulating the updates of the total demand for power determined for the finite number of communication steps to produce the total demand for power in the network.

DETAILED DESCRIPTION

Figure 1:
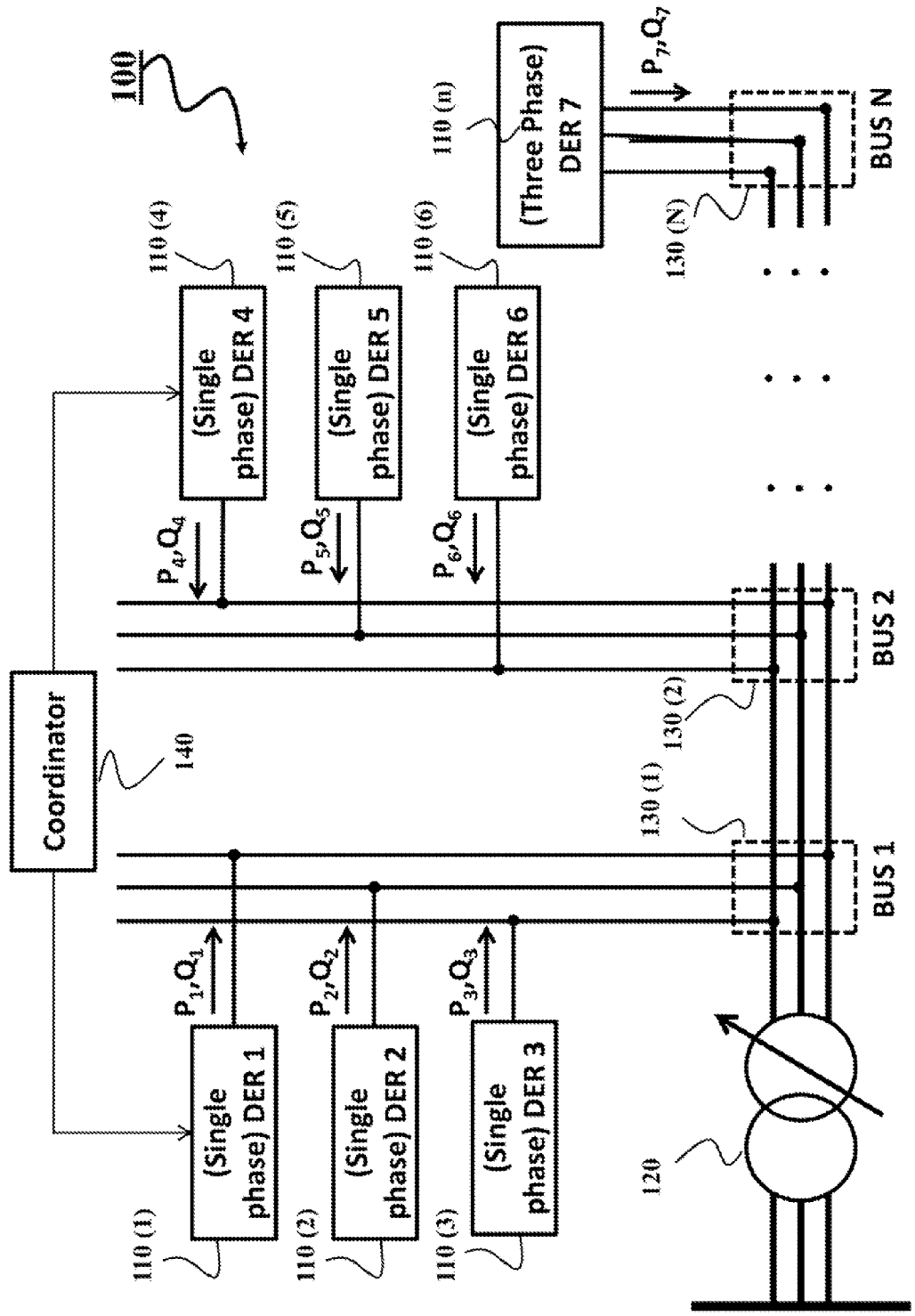
FIG. 1 is a schematic of an example a power grid that includes a network of distributed energy resources (DER) employing some principles of the invention.

FIG. 1 shows an example a power grid 100 that includes a network of distributed energy resources (DER) 110(1)-110(n) employing some principles of the present disclosure. Specifically, each DER of the network determines, within a finite number of communication steps, the power to be supplied to the distributed energy system, such that the power generated jointly by all DERs of the network meets the total power requirement of the energy system without violating constraints of each DER. The power can include one or combination of active P and reactive Q powers.

The power grid 100 also includes at least one generator 120 and multiple buses 130(1)-130(N). In addition to the generator and the network of DERs, the power grid 100 can include other electrical power sources. DERs with intermittent energy sources, such as wind, may include battery systems connected between the power grid and any generator that may be present in the DER. The power grid can supply power to the loads that can include AC and/or DC loads in homes, condominiums, office buildings, shopping malls, manufacturing, research and development facilities, recreational areas and complexes, office parks, and university and college campuses, among many others.

The power grid can also include a coordinator 140 for controlling of the network of DERs to jointly provide the amount of requested power. However, the coordinator can communicate only with a subset of DERs, e.g., with the DER 110(1) and DER 110(4). The DER that can communicate with the coordinator is referred to as $J_{init}$ signifying that the DER has access to the coordinator's command for power.

Similarly, each DER can communicate with neighboring DER. In the network of DERs, each DER has at least one neighboring DER with whom the DER can communicate within one hop. For example, the DER 110(1) can communicate with the DER 110(2) and the DER 110(4). The DER 110(2) can communicate with the DER 110(1) and the DER 110(3). The DER 110(3) can communicate only with the DER 110(2).

Each DER can determine, e.g., measure, its own maximum capability to generate power. However, the total demand for power and the total capability of the network to generate the power is generally unknown and vary over the time.

Some embodiments are based on recognition that there is a need and a possibility to determine, by each DER, the total demand for power and the total capability of the network within a fixed number of communication steps. Specifically, it was realized that if the portions of the total demand for power and the total capability of the network are recursively accumulated and propagated by each DER, after the fixed number of communication steps, all DERs can accumulate the correct value of the total demand for power and the total capability of the network.

Figure 2:
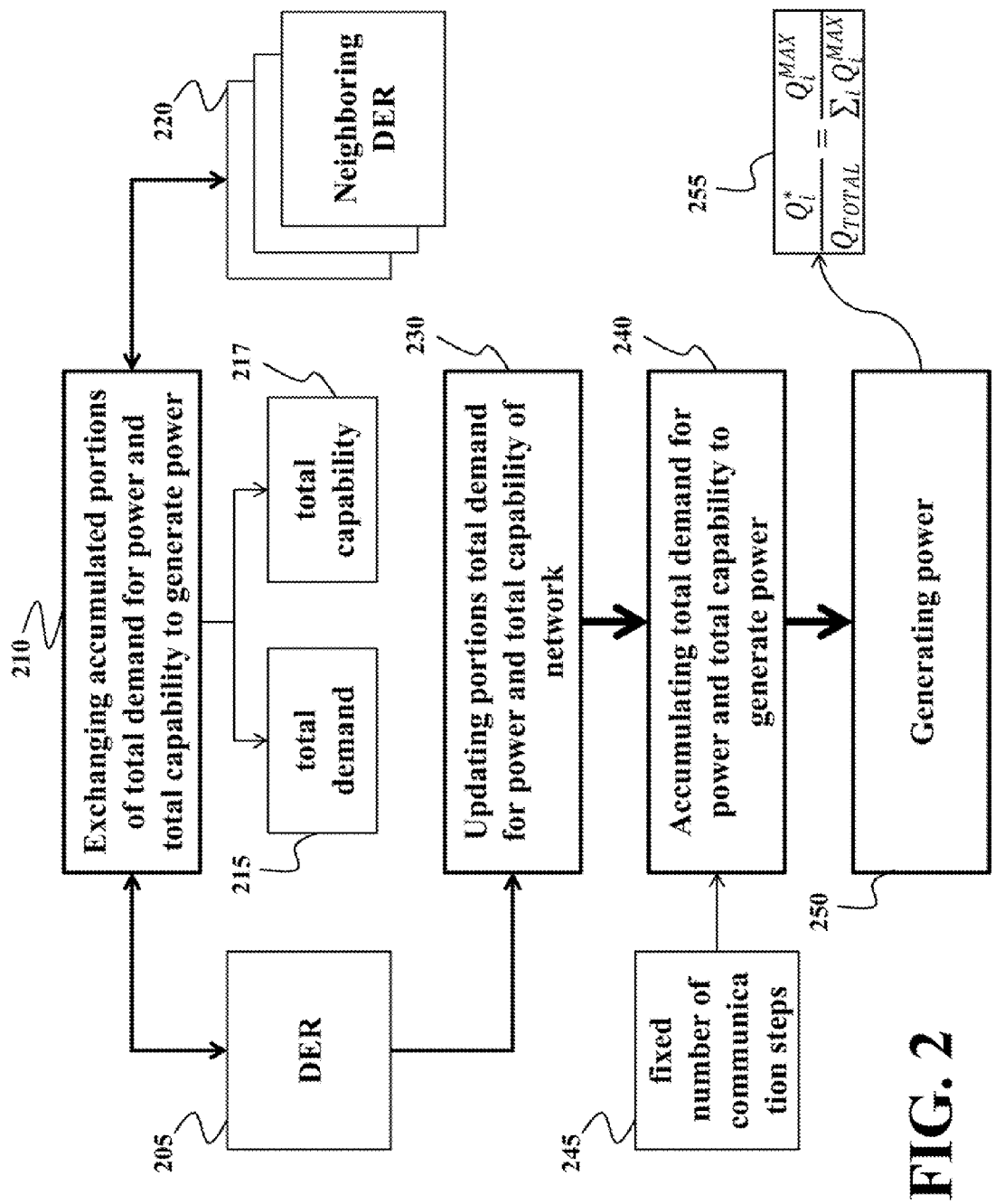
FIG. 2 is a block diagram of a method for generating a power by a DER according to some embodiments of the invention.

FIG. 2 shows a block diagram of a method for generating a power by a distributed energy resource (DER) into a power grid including a network of DERs, such that a total demand for power in the power grid is jointly satisfied by the network of DERs. The method can be implemented using processors of each DER operatively connected to corresponding transceivers of the DERs.

At each communication step, a DER 205 exchanges 210 with each neighboring DER 220 portions of the total demand 215 for power accumulated by the DER and each neighboring DER before the communication step, and portions of a total capability 217 of the network to generate the total power accumulated by the DER and each neighboring DER before the communication step.

After each communication step, the DER updates 230 the portion of the total demand for power accumulated by the DER before the communication step using the portions of the total demand for power received from the neighboring DERs. The DER also updates 230 the portion of the total capability of the network accumulated by the DER before the communication step using the portions of the total capability of the network received from the neighboring DERs.

In such a manner, after a fixed number of communication steps 245, the DER accumulates 240 the total demand for power and the total capability of the network to generate the power. Next, the DER generates an amount of the power, e.g., the amount $Q_i^*$ 255, as a product of the total demand for power and a ratio of a maximum capability of the DER to generate the power and the total capability of the network to generate the power.

The embodiments exchange, at each communication step, only two types of data, i.e., portions of the total demand for power, and portions of a total capability of the network accumulated by each DER before the communication step. Thus, the amount of exchanged messages is reduced, as compared, e.g., with a total exchanged of information among the DERs.

In addition, such an exchange allows determining the correct value of the total demand for power and the total capability of the network within a fixed number of communication steps, as contrasted with asymptotical methods, in which each DER converges to a solution asymptotically without ever achieving the exact value of the power to be generated.

Figure 3:
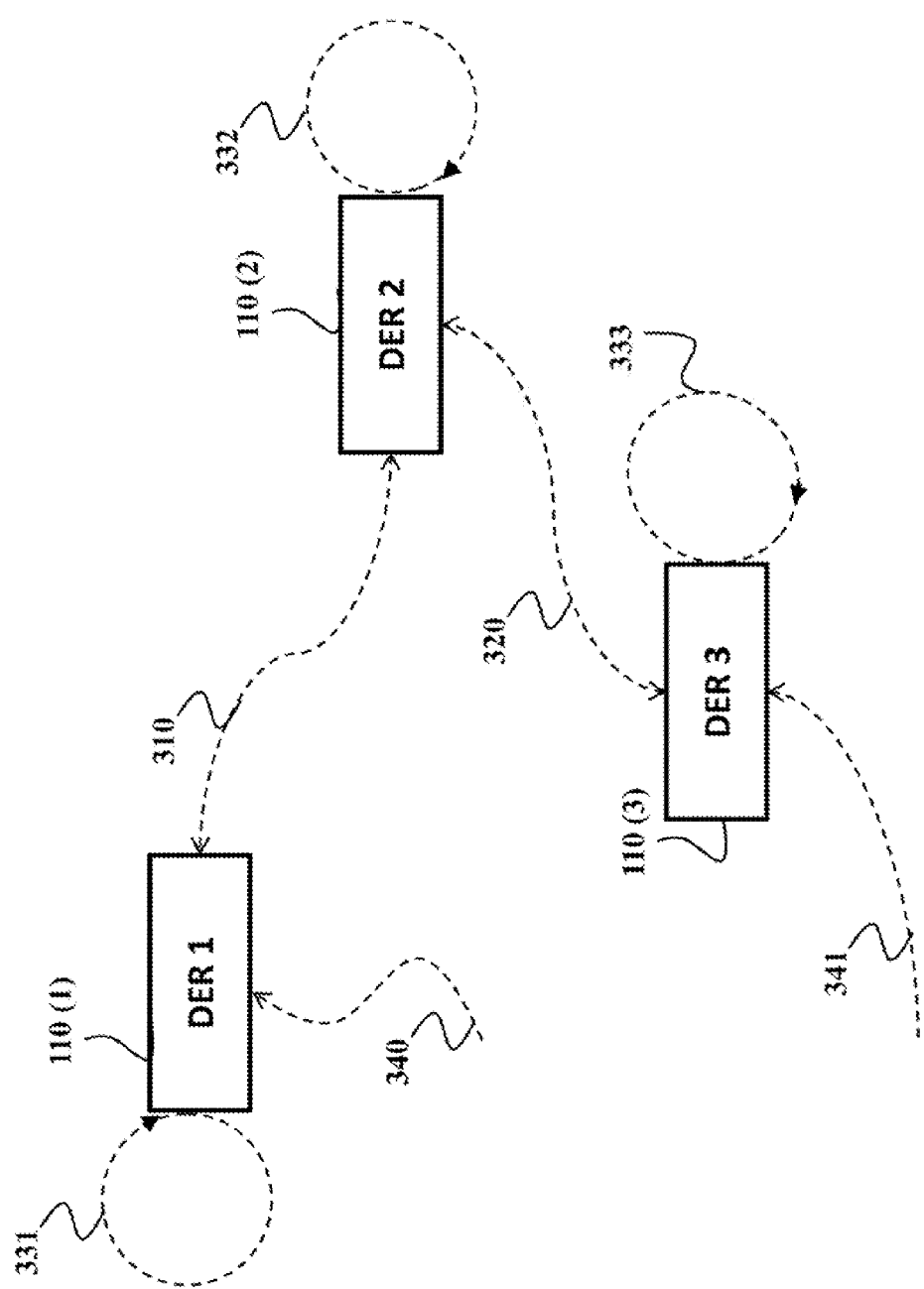
FIG. 3 is a schematic of recursive exchange and accumulation of the portions of the total demand for power or total capability of the network to generate the power according to some embodiments of the invention.

FIG. 3 shows a schematic of recursive exchange and accumulation of the portions of the total demand for power or total capability of the network to generate the power. At each communication step, the DER, e.g., the DER 110(2) receives from neighboring DERs, such as DER 110(1) and the DER 110(3), at least a portion of a total demand of reactive power in the network or at least a portion of a total capability of the network to generate the reactive power via communication links 310 and 320. The DER 110(2) recursively updates 332 its knowledge abound the demand and the capability of the power, and thus accumulates the total demand and capability information.

Similarly, each neighboring DER, such as DER 110(1) and the DER 110(3), recursively updates 331 and 333 the portion of the total demand and the portion of the total capability based on information propagated within the network at each communication step. Within each communication step, the information propagates further and further within the network of DERs through communication links 310 and 320, as well as other communication links, e.g., 340 and 341.

During the exchange, the portions of the total demand and capability of power can include previously transmitted information. Accordingly, some embodiments of the invention encode and decode portions of the total demand for power and the total capability of the network exchanged among the DER. Such encoding and decoding operations allow to correctly determining the increase of the total demand for power and the total capability of the network contributed during each communication step.

Some embodiments take advantage from the fact that a structure of the network of DER is relatively stable. Those embodiments determine the structure of the network of DER and determine the encoding and decoding coefficients based on the structure. Some embodiments determine the structure of the network of DER during an initialization phase, as described below.

Figure 4:
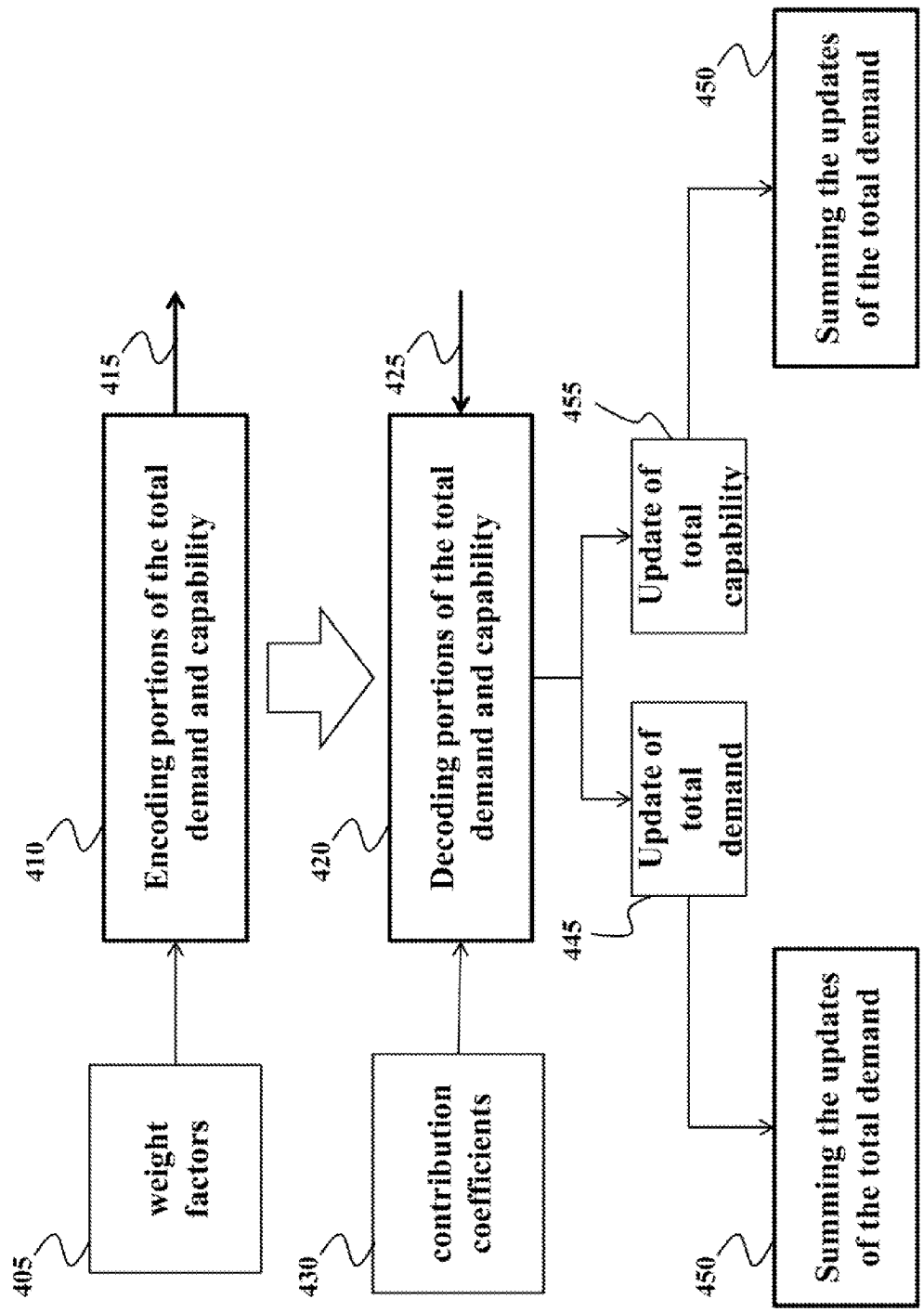
FIG. 4 is a block diagram of a method employing decoding and encoding operations performed by the DER according to some embodiments of the invention.

FIG. 4 shows a block diagram of a method employing decoding and encoding operations performed by the DER according to some embodiments. Specifically, the DER encodes 410 the portion of the total demand for power and the portion of the total capability of the network accumulated by the DER with a weight factor 405 before transmitting the encoded portions 415 to the neighboring DERs. For example, one embodiment, for a current communication step, randomly selects, e.g., during the initialization phase, the weight factors from a continuous distribution. Other examples of determining weight factors are provided below.

Also, the DER decodes 420 the portion of the total demand for power and the portion of the total capability of the network received 425 from each neighboring DERs with a contribution coefficient 430. The contribution coefficients 430 are predetermined for each communication step, e.g., during the initialization phase, as described below. Thus, the decoding 420 produces an update 445 of the total demand for power and an update 455 of the total capability to generate power corresponding to each communication step.

The DER sums 450 the updates 445 of the total demand determined for a finite number of communication steps to produce the total demand of the power in the network. Similarly, the DER sums 450 the updates 455 of the total capability determined for the finite number of communication steps to produce the total capability of the network.

Thus, each DER determines the total demand of the power and the total capability of the network to generate the power by exchanging messages with only neighboring DERs. Each DER can provide the requested power to the grid proportionally to its own power capability, thus sharing the power requirement fairly among the DERs.

Each DER stores two information states that are recursively updated based on communication with the neighboring DERs, and the information that those neighboring DERs possess. The first state is $z_j^{cap}[k]$, which is a single value defining a portion of the total capability of the network to generate power accumulated by the DER j at step k. The second state is $z_j^{tot}[k]$, which is a single value, defining a portion of the total demand for power accumulated by the DER j at step k.

In one embodiment, before the information propagation begins, the DERs are initialized based on the information that is available to each DER at the beginning of the information exchange. The DERs neighboring the coordinator can communicate with the coordinator to initialize its power demand information state $z_j^{tot}[0]$ as equal to the total power demand. The other DERs that do not have access to the total power demand information initialize their $z_j^{tot}[0]$ as equal to zero.

In various embodiments, each DER has access to their maximum capability for power and can initialize their $z_j^{cap}[k]$ by making this state equals to their maximum power capability. The DERs information states are stored in its memory for all future steps, and recursively updated based on information from neighbors. The propagation of information is encoded and decoded as described below.

Figure 5:
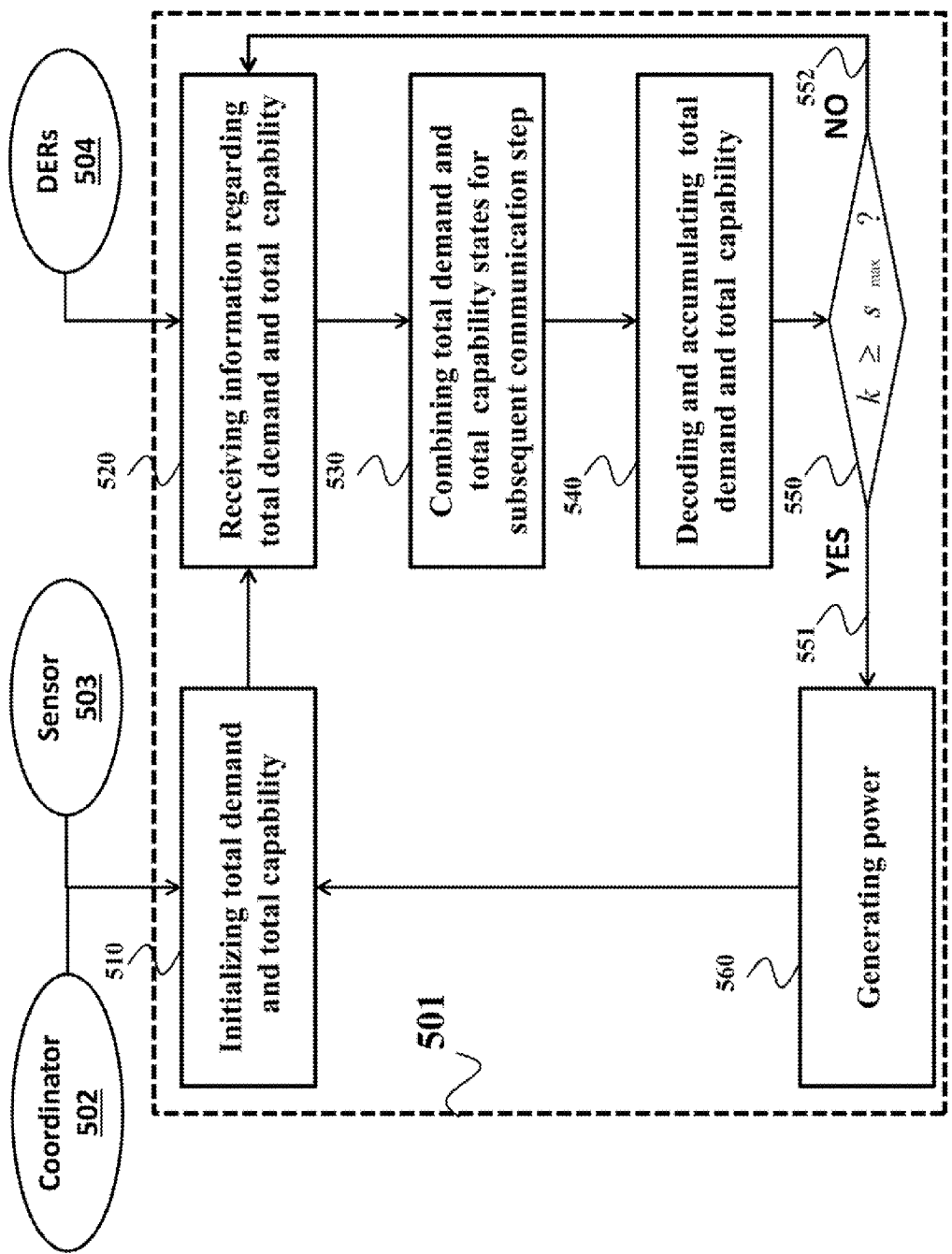
FIG. 5 is a block diagram of operations performed at the DER during the power estimation state according to some embodiments of the invention.

FIG. 5 shows a block diagram of operations performed at the DER j during the power estimation procedure. Before exchanging data with neighbors, the DER initializes the information states as described, using measurements of the sensor 503 and information received from the coordinator 502, if the DER neighboring the coordinator. The method can be implemented by a processor 501 of the DER.

For example, the DER initializes 510, i.e., k=0, the states $z_j^{tot}[0]$ and $z_j^{cap}[0]$ according to $$z_{j,tot}[0] = \begin{cases} \frac{\text{Total Power}}{M}, & j \in J_{init} \\ 0, & j \notin J_{init} \end{cases}$$

$$z_{j,cap}[0] \leftarrow -- \text{ by sensors.}$$

In this embodiment, a number M is the number of initial DERs, $J_{init}$, neighboring the coordinator 502. Hence, if there are multiple initial DERs that receive the total power demand requirement from the coordinator, the initial DERs share the power demand requirement from the coordinator equally, i.e., each DER gets an 1/M portion of the power demand requirement.

The DER receives 520 the two information states from each of its neighboring DER 504 and stores the received information in two observation vectors. The first vector $y_j^{tot}[k]$ of a size equal to the number of neighbors of DER j storing the observations of DER j received from the neighboring DERs regarding their capability to generate power accumulated at step k. The second vector $y_j^{tot}[k]$, also of a size equal to the number of neighboring DERs, stores the observations of DER j received from neighboring DERs regarding their total power demand information accumulated at step k.

In one embodiment, the DER assigns a weight for each of its neighboring DER stores in the matrix $C_j$. For example, the information states received from neighboring DERs can be accumulated according to $$y_j^{tot}[k] = C_j z_{tot}[k];$$

$$y_j^{cap}[k] = C_j z_{cap}[k];$$

$$k = k+1,$$

wherein, $y_j^{cap}$ the power capability observation vector, $y_j^{tot}$ the power demand observation vector and k is the iteration index. This step is referred to as encoding the received observations.

The DER combines 530 the newly received states of total power demand and power capability with states previously received by the DER. This combination is propagated by the DER to its neighboring DERs during the next communication step k+1. In one embodiment, the combination 530 is a linear combination using information propagation weights $w_{ji}$. Combining all information received from the neighboring DERs in one single value reduce the communication overhead. Hence, the embodiments store all information received in two states, i.e., $z_j^{cap}[k+1]$ and $tz_j^{tot}[k+1]$.

For example, in one embodiment, the DER accumulates the information about states according to $$z_{j,tot}[k+1] = w_{jj} z_{j,tot}[k] + \sum_{i \in N_j^-} w_{ji} z_{i,tot}[k];$$

$$z_{j,cap}[k+1] = w_{jj} z_{j,cap}[k] + \sum_{i \in N_j^-} w_{ji} z_{i,cap}[k],$$

wherein j is an index of DER, i is an index of neighboring DERs, $N_j^-$ is a number of neighboring DERs, $w_{ji}$ are the weight coefficients and k is the iteration index.

The DER also decodes 540 the information received from the neighboring DERs to produce an update of the total demand and an update of the total capability corresponding to the current communication step. The decoded information is accumulated in the DER. In some embodiments the decoding is performed multiplies the received observation vectors with a predetermined contribution vector $a_j[k]$, computed during the initialization phase.

The contribution vector $a_j[k]$ is a vector of size equal to the number of neighboring DERs. The contribution vector $a_j[k]$ is determined in advance based on a size and topology of the network of DERs. The decoding procedure and accumulation step can include multiplying the contribution vectors with the observation vector, and summing the resulting updates with the current estimates of DER j to the total power capability and total power demand. For example, one embodiment performs the decoding and accumulation 540 according to:

$$\text{TotalCap}[k+1] = \text{TotalCap}[k] + a_j[k] y_j^{cap}[k];$$

$$\text{TotalDemand}[k+1] = \text{TotalDemad}[k] + a_j[k] y_j^{tot}[k],$$

wherein TotalCap is the total power capability, TotalDemand is the total power demand, $y_j^{cap}$ the power capability observation vector, $y_j^{tot}$ the power demand observation vector, $a_j$ is the contribution vector, j is the DER index, and k is the iteration index.

In various embodiments, the index of a current communication step is compared 550 with a fixed number of communication steps $S_{max}$. The fixed number of communication steps $S_{max}$ can be determined in advance during the training stage. If the index is less than $S_{max}$, the DER repeats 552 recursively the receiving and the accumulation of power requirements. After the fixed number of communication steps $S_{max}$ 551, the total demand for power and the total capability of the network to generate the power is accumulated at each DER. The DER generates 560 an amount of the power as a product of the total demand for power and a ratio of a maximum capability of the DER to generate the power and the total capability of the network. The power can be one or combination of the active and reactive power. For example, the DER, according to one embodiment, request its power controller to generate power according to $$Power_j(k+1) = \frac{cap_j}{TotalCap(k+1)} TotalDemand(k+1),$$

wherein $cap_j$ represents the total power capacity of the DER of index j, TotalCap(k+1) is the total power capacity accumulated at DER j up to the iteration k+1, TotalDemand(k+1) is the total power demand accumulated at DER j up to the iteration k+1, $Power_j(k+1)$ is the power to be generated by the DER j as computed up to the iteration k+1 and k is the iteration index.

In one embodiment, after the power estimation method of FIG. 5 has been executed, the DER then re-initializes, to continue the power estimation. Thus, this method is performed continuously and the network of DERs can track a time-varying command of the coordinator or a time-varying available capability.

Figure 6:
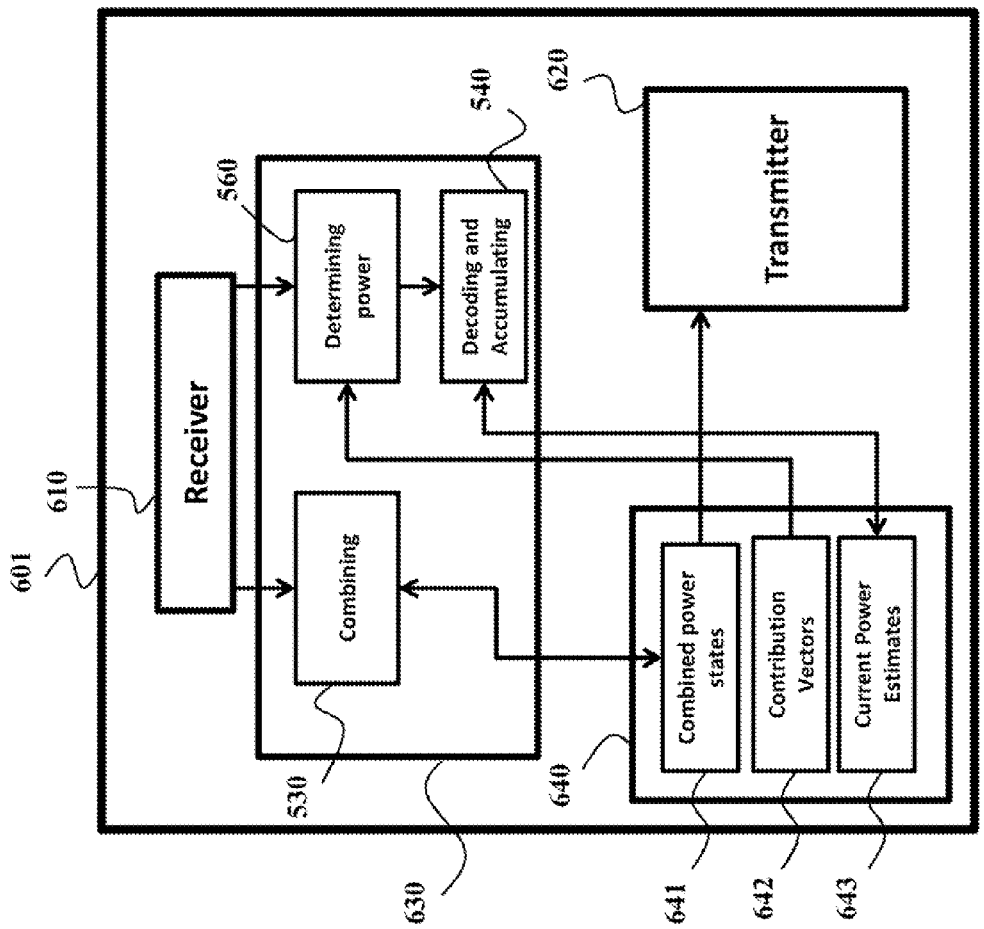
FIG. 6 is a block diagram of a power control module of the DER employing the principles of various embodiments of the invention.

FIG. 6 shows a block diagram of a power control module 601 of the DER employing the principles of various embodiments of the invention. The power control module includes a receiver 610 for receiving two information states from each neighboring DER and transmitter 620 for transmitting updated state information to the neighboring DERs. The power control module also includes a processor 620 for performing required calculations, as e.g., described with relation to FIG. 5. The received and calculated information is stored in the memory 640. For example, the memory can store results 641 of the combining total demand and total capability states for subsequent communication step, the contribution vector 642 and portions of the total demand and total capability accumulated at the current communication step.

Figure 7:
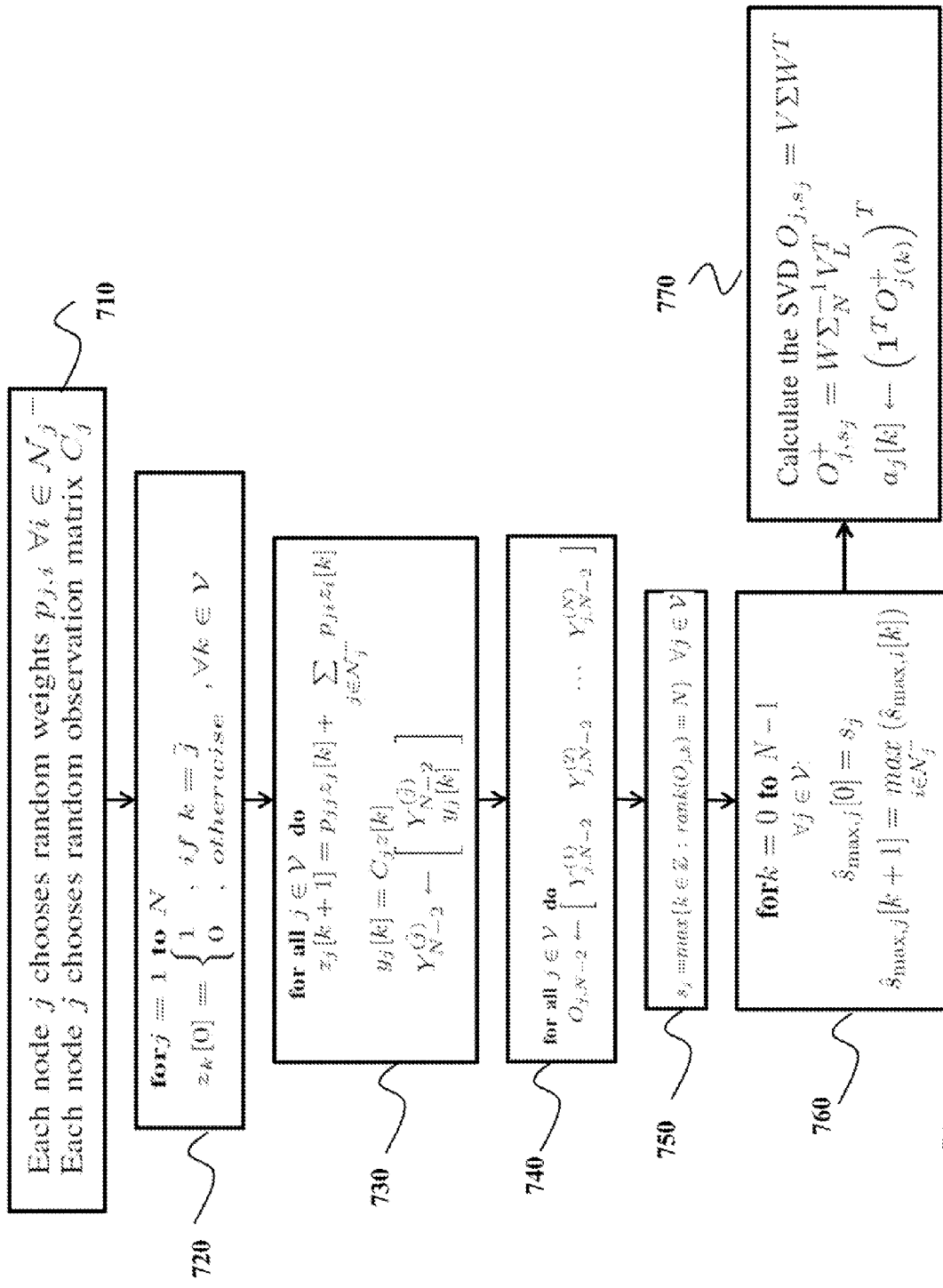
FIG. 7 is a flowchart of an initialization phase performed by each DER in the network according to some embodiments of the invention.

FIG. 7 shows a block diagram of an initializing phase of the DERs employing some principles of the invention. In some embodiments, the initialization phase is used to determine or transmit to each of the DERs in the network the following set of information.

First, during the initialization phase, each DER can determine the information propagation factors $w_{ji}$, that DER uses to linearly combine power information. The information propagation factors can be selected randomly by a continuous distribution and be constant for all communication steps of the power sharing phase.

Second, during the initialization phase, each DER can determine an observation matrix $C_j$ that assigns a weight to each observation received from the neighboring DERs. The observation matrix can be selected randomly by a continuous distribution, and remains constant for all communication steps of the power sharing phase.

Third, during the initialization phase, each DER can determine the fixed number of communication steps, $s_{max}$, required for proper accumulation of power information.

Fourth, during the initialization phase, each DER can determine the contribution vectors $a_j[k]$ that are unique to step k and DER j and, when multiplied with the vector of observations from neighbors for DER j in step k, decode the update of the power information corresponding to the current communication step.

This information can be initialized by several methods. For example, in on embodiment, this information can be initialized by simple message passing between all the DERs of the network until all the DERs have received all the necessary information to start the power estimation phase. In another embodiment, the initialization phase can be made faster by using the steps shown on FIG. 7. The following steps are performed:

Each DER j independently and randomly selects 710 the information propagation factors $w_{ji}$, for each DER i that is a neighbor of i ($w_{ji}=0$ for all other DER's because DER j receives no information from DER i).

Each DER j independently and randomly selects 710 the observation weights $c_{ji}$ and forms matrix $C_j$. Note that Cj is an Dj×N matrix, where Dj is the number of neighbors of DER j, and all columns that correspond to DER's that are not neighbors of DER j are zero columns. All other elements are randomly selected.

Subsequently, the message exchanging part of the training phase begins with the node 1 of the network initializes 720 itself with one information state with value 1. All other nodes initialize themselves with one information state of value 0.

Then, all nodes start performing 730 in each step of message exchanges the following operations: One observation of neighbors' value with observation weights cji. One linear combination of neighbors information (propagation of information) with propagation factors $w_{ji}$. The observation vectors of for DER j at step k are stored in a cumulative vector Yj,1, one below the other. Yj,1 increases at each step 730. After N−2 steps, store the vector Yj,1 as the first column of matrix Oj. After that, all nodes reinitialize themselves, with node 2 this time initializing 720 its information state at 1 and all others at 0. The procedure outlined before (N−2 steps of message exchanges) is repeated, yielding vector Yj,2 for each DER j, which is stored as the second column of Oj.

After N initializations and executions of the step 730, all DERs have acted as the initializing node once, and N vectors Yj,k have been obtained at each DERs memory, forming a matrix Oj that includes of N columns 740. Next, each of the DER j obtains sj as the minimum number of steps required for Oj to become full rank matrix 750.

Subsequently, all DER's agree on $s_{max}$, which is the number of steps required for all DER's to have an Oj that is full rank 760. Then, each DER obtains the step contribution coefficients 770 using the pseudoinverse of Oj, called $Oj^+$. The step contribution vectors are determined as a multiplication of a submatrix of $Oj^+$ with an N×1 vector of ones.

Various embodiments of the invention can be operated by numerous general purpose or special purpose computing system environments or configurations.

For example, the embodiments may be implemented using hardware, software or a combination thereof. When implemented in software, the software code can be executed on any suitable processor or collection of processors, whether provided in a single computer or distributed among multiple computers.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for generating power by a distributed energy resource (DER) for a power grid including a network of DERs, such that a total demand for the power in the power grid is jointly satisfied by the network of DERs, comprising:
   exchanging, between the DER and each neighboring DER at each communication step of a fixed number of communication steps, portions of the total demand for power accumulated by the DER and each neighboring DER before the communication step, and portions of a total capability of the network to generate the total power accumulated by the DER and each neighboring DER before the communication step;
   updating, after each communication step, the portion of the total demand for power accumulated by the DER before the communication step using the portions of the total demand for power received from the neighboring DERs;
   updating, after each communication step, the portion of the total capability of the network accumulated by the DER before the communication step using the portions of the total capability of the network received from the neighboring DERs;
   accumulating, after the fixed number of communication steps, the total demand for power and the total capability of the network; and
   generating an amount of the power as a product of the total demand for the power and a ratio of a maximum capability of the DER to generate the power and the total capability of the network.

2. The method of claim 1, further comprising
   encoding the portion of the total demand for power and the portion of the total capability of the network accumulated by the DER with a weight factor randomly selected from a continuous distribution for a current communication step;
   decoding the portion of the total demand for power and the portion of the total capability of the network received from each neighboring DERs with a contribution coefficient predetermined for the current communication step to produce an update of the total demand and an update of the total capability corresponding to the current communication step;
   summing the updates of the total demand determined for a finite number of communication steps to produce the total demand of the reactive power in the network; and
   summing the updates of the total capability determined for the finite number of communication steps to produce the total capability of the network.

3. The method of claim 2, wherein the contribution coefficients are determined based on a topology and a size of the network of DERs.

4. The method of claim 1, wherein the total demand for power is a demand for reactive power, and the total capability of the network is a capability of the network to generate the reactive power.

5. The method of claim 4, wherein the DER generates the reactive power $Q_i^*$ determined according to $$\frac{Q_i^*}{Q_{TOTAL}} = \frac{Q_i^{MAX}}{\sum_i Q_i^{MAX}},$$

wherein i is an index of the DER in the network, $Q_i^{MAX}$ is a maximum reactive power capability of the DER, and $\sum_i Q_i^{MAX}$ is the total capability of the network to generate the reactive power.

6. The method of claim 1, wherein the finite number of communication steps is N–2, and wherein N is a size of the network.

7. A method for generating a reactive power by a distributed energy resource (DER) into a power grid including a network of DERs, comprising:
   a receiving, from neighboring DERs at each communication step, at least a portion of a total demand of reactive power in the network and at least a portion of a total capability of the network to generate the reactive power, wherein, at each communication step, each neighboring DER recursively updates the portion of the total demand and the portion of the total capability based on information propagated within the network at each communication step;
   determining, at each current communication step, an update of the total demand and an update of the total capability corresponding to the current communication step using a contribution coefficient predetermined for the current communication step;
   summing the updates of the total demand determined for a finite number of communication step to produce the total demand of the reactive power in the network;
   summing the updates of the total capability determined for the finite number of communication step to produce the total capability of the network; and
   generating an amount of the reactive power proportional to the total demand and a ratio of a maximum capability of the DER to generate the reactive power and the total capability of the network.

8. A distributed energy resource (DER), comprising:
   a memory storing a finite number of contribution coefficients, each contribution coefficient corresponds to a communication step from the finite number of communication steps and indicates an update of a total demand for power at the corresponding communication step;
   a receiver for receiving, at each communication step, a portion of the total demand for power accumulated by each of neighboring DERs;
   a transmitter for transmitting, to each of the neighboring DERs at each communication step, a portion of the total demand for power accumulated by the DER; and
   a processor for decoding from the received portion of the total demand for power the update of the total demand for power using a contribution coefficient corresponding to a current communication step and for accumulating the updates of the total demand for power determined for the finite number of communication steps to produce the total demand for power in the network.

* * * * *